United States Patent [19]

Orbach

[11] Patent Number: 4,623,923
[45] Date of Patent: Nov. 18, 1986

[54] REAL-TIME VIDEO IMAGE ENHANCEMENT SYSTEM

[75] Inventor: Zvi Orbach, Waltham, Mass.

[73] Assignee: Honeywell Inc., Minneapolis, Minn.

[21] Appl. No.: 474,954

[22] Filed: Mar. 14, 1983

[51] Int. Cl.$^4$ ............................................. H04N 5/14
[52] U.S. Cl. ..................................... 358/166; 358/163
[58] Field of Search ................. 358/166, 163, 169, 37, 358/30

[56] References Cited

U.S. PATENT DOCUMENTS

| | | | |
|---|---|---|---|
| 3,983,320 | 9/1976 | Ketcham | 358/166 |
| 4,213,150 | 7/1980 | Robinson | 358/166 |
| 4,281,347 | 7/1981 | Tschannen | 358/166 |
| 4,365,304 | 12/1982 | Ruhamn | 358/166 |

OTHER PUBLICATIONS

Low-Level Processing for Real-Time Image Analysis, by Eskenazi, NASA, Jpl. Publication 79-79, Sep. 1, 1979, pp. 1-12.
Description of Two Hardware Convolvers as a Part of a General Image Computer, by Wambacq, et al., Proceedings of PR & IP, Aug. 1961, pp. 294-296.
Real-Time Image Enhancement Using 3×3 Pixel Neighborhood Operator Functions, by Hall, Optical Engineering/May/Jun. 1960, vol. 19, No. 3, pp. 421-424.
Chip Helps Detect Targets Automatically, Electronics, Mar. 1973, pp. 241-242.
Edge Detection by Compass Gradient Masks, by G. Robinson, Computer Graphics and Image Processing, vol. 6, 1977, pp. 492-501.
A T.V. Type of Analogue Image Processor, by Y. Morikawa, et al., Optica Acta, Oct. 1980, vol. 27, No. 10, 1411-1432.

Primary Examiner—Tommy P. Chin
Attorney, Agent, or Firm—John S. Solakian; Albin Medved

[57] ABSTRACT

A hardware convolver for real-time video processing. The convolver utilizes digital and analog circuits to convolve a digitized video with a user defined "mask" to generate an "analog" video output. The convolver is very efficient for final processing of real-time digitized video image enhancement.

12 Claims, 3 Drawing Figures

REAL-TIME VIDEO IMAGE ENHANCEMENT SYSTEM

BACKGROUND OF THE INVENTION

The present invention relates generally to video image enhancement systems, and, more particularly, to hardware convolvers for processing of real-time digitized video images.

The use of local operators such as the 3×3 convolution mask operator for two-dimensional image filtering is a well developed art known to be quite effective for edges, contour enhancement, and detection. In the article by Guner S. Robinson, entitled "Edge Detection by Compass Gradient Masks", published in the COMPUTER GRAPHICS AND IMAGE PROCESSING, Vol. 6, pp. 492-501, 1977, Robinson presented more than thirty (30) 3×3 convolution masks. Such operator is most popular for enhancement of contour—one of the most important features of an image. With an appropriate mask, a neighborhood averaging for noise reduction (low-pass) can also be achieved.

Since such operators are relatively simple, a number of hardware implementations have been built and proposed. In an article entitled "Chip Helps Detect Target Automatically", published in ELECTRONICS, pp. 41, March, 1978, as well as an article by Joseph E. Hall and James D. Aurtney, entitled "Real-Time Image Enhancement Using 3×3 Pixel Neighborhood Operator Functions", published in OPTICAL ENGINEERING, Vol. 19, No. 3, pp. 241, May, 1980, an analog system is presented utilizing a charge coupled device (CCD) to generate the one line delay required, and to perform the convolution operation as well. Such systems are currently limited by the CCD transfer rate (2 MHz). In an article by R. Eskenazi and J. M. Wild, entitled "Low-Level Processing for Real-Time Image Analysis", in the September, 1979 JPL Publication, and in an article by P. Wambacq et al, entitled "Description of Two Hardware Convolvers As A Part Of A General Image Computer", published in the Proceedings of PR & IP, pp. 294, August, 1981, digitally-implemented operators are proposed. The first one describes a fixed pipeline convolution unit while the second utilizes nine (9) expensive digital multipliers and summation networks. These prior art systems are rather complex and are considered to be inefficient in terms of cost, size and power consumption or are limited by the transfer rate of system processing.

It is accordingly a primary object of the present invention to provide an improved video image enhancement apparatus which is efficient and capable of high transfer rates.

SUMMARY OF THE INVENTION

The above and other objects of the invention are achieved by providing a video enhancement system having an input for receiving a video signal to be enhanced, such signal received a line at a time, each line having a plurality of pixels; apparatus for digitizing the video signal so received; storage apparatus for temporarily storing a predetermined number of immediately previously received lines of such video signal; a plurality of register devices, coupled with such storage apparatus, for temporarily storing a matrix array of pixel signals of selected pixels of the present line of said video signal and such predetermined number of immediately previously received lines of such video signal; apparatus for providing selectable mask signals; apparatus for multiplying said mask signals times corresponding ones of said pixel signals; and apparatus for summing said pixel signals as modified by said mask signals in order to provide an enhanced video signal.

BRIEF DESCRIPTION OF THE DRAWINGS

The objects of the present invention are achieved in the illustrative embodiment as described with respect to the Figures in which.

DETAILED DESCRIPTION OF THE PREFERRED EMBODIMENT(S)

Figure 1:
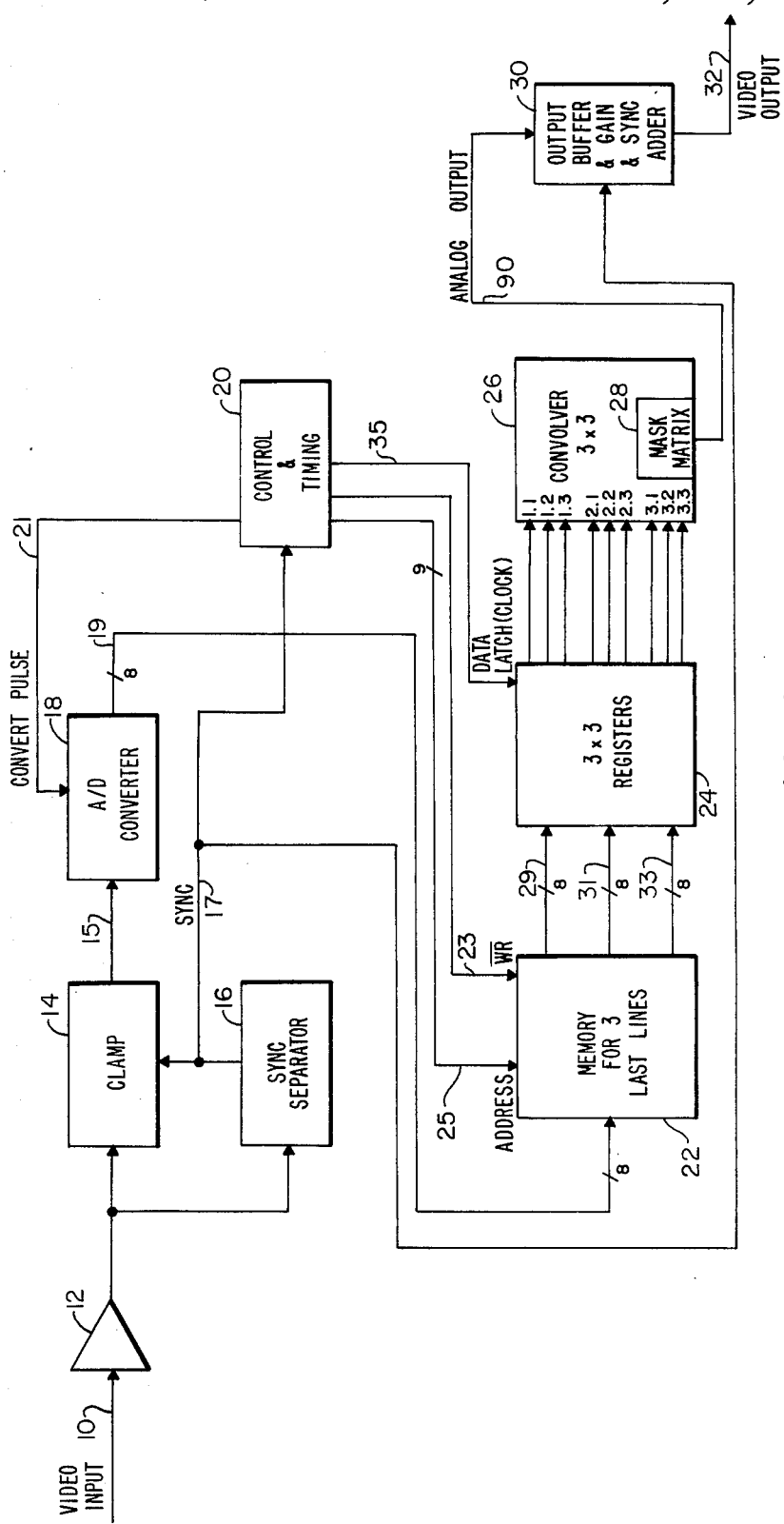
FIG. 1 is a block diagram of the system of the present invention.

FIG. 1 is a block diagram of the system of the present invention. On line 10 an incoming video signal is received and is buffered by buffer 12. The output of buffer 12 is coupled to a clamp circuit 14 and a sync separator circuit 16. The incoming video is received with a synchronization (sync) signal, and, accordingly, the purpose of sync separator 16 is to separate sync pulses from the video signal. The sync pulse is provided on line 17 at the output of sync separator 16. The clamp circuit 14 is basically a bias or offset circuit so that the incoming video signals with the sync are presented at the output on line 15, but with reference to the same bias level independent of the source of the video signal. The sync signal is used to synchronize clamp circuit 14, and to synchronize the control and timing logic 20. The sync signal is also added to the output video on line 32 by sync adder 30. The output of the clamp circuit 14, which is a DC restored video, is coupled via line 15 to the analog to digital (A/D) converter 18. The output of converter 18 is a digitized (e.g., 8 bits) signal which represents the digitized video. The converter 18 is set to digitize the video portion only of the signal on line 15, and, accordingly, the sync pulses are not represented in the signal on line 19.

Figure 2:
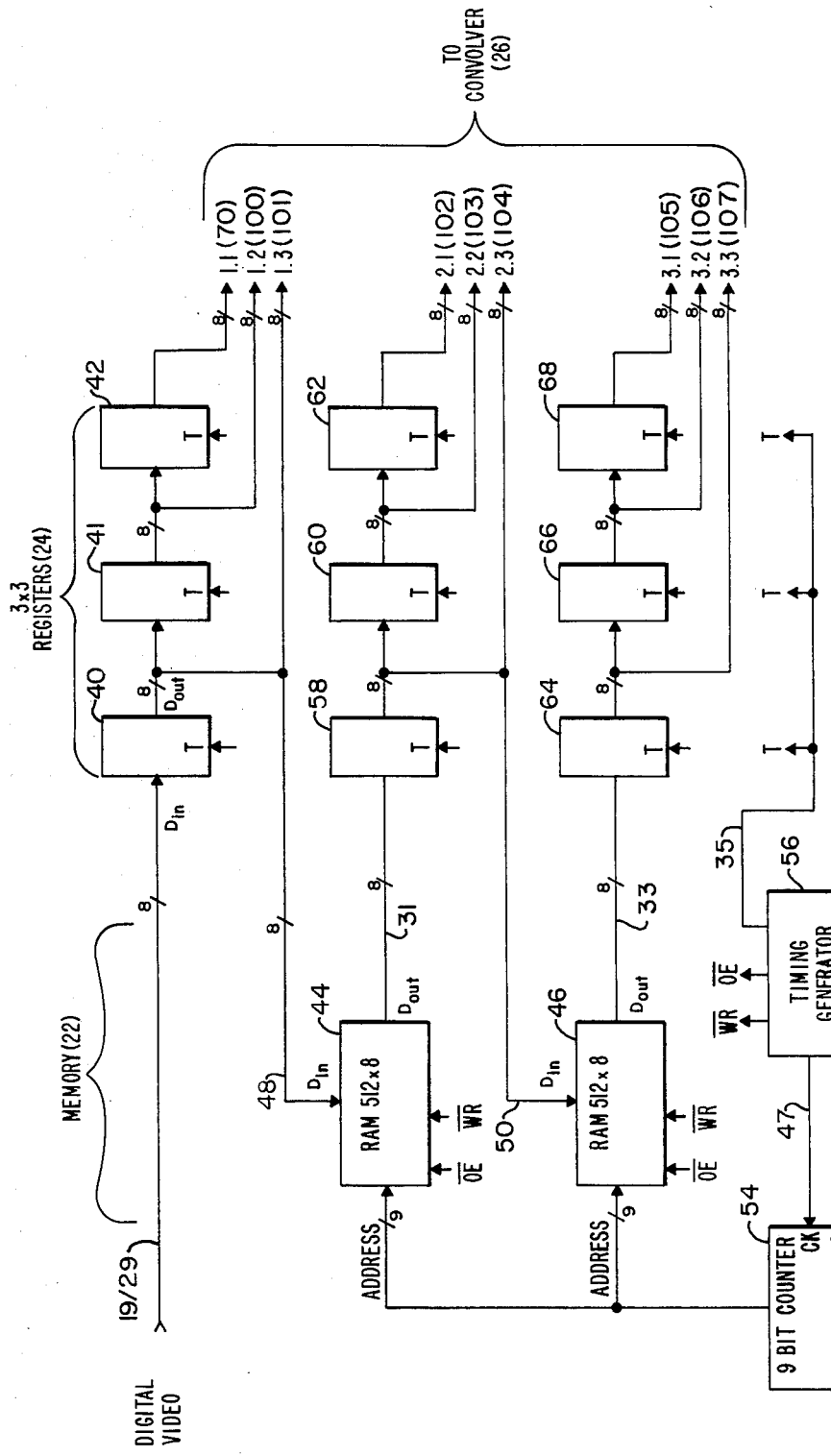
FIG. 2 illustrates details of the memory, control and timing logic and pixel registers of the present invention.

The control and timing logic 20 generates various pulses, including the convert pulse on line 21, the write pulse (WR) on line 23, the address signal on line 25, and the data latch (clock) pulse on line 35. Certain details of logic 20 are shown in FIG. 2. The convert pulse on line 21 activates the converter 18. Thus, each time a sync pulse is received by control and timing logic 20, it synchronizes and/or generates a train of convert pulses. The convert pulses are high frequency pulses which, for example, may be at a 10 megahertz rate. For each sync pulse, and, by way of example, 512 convert pulses may be generated. Thus, there is a conversion from analog to digital in a synchronized manner per line. Each time there is a convert pulse there is an output generated on line 19, which output is then transferred into memory 22 and registers 24. Memory 22 holds a predetermined number of previously received lines of the digitized video signal. By way of example, there may be two previously scanned lines stored in memory 22.

The digitized video on line 19 is effectively transferred to memory 22 through a portion of registers 24 as shown in detail in FIG. 2. The information in memory 22 is effectively shifted in as each pixel of video is received, so that at all times, information representative of, for example, three (3) lines of video will be available for further processing. The write signal received by memory 22 on line 23 is a clock pulse which enables the storage of each pixel of video in memory 22. The address signal on line 25 is generated by a nine bit counter 54 of the control and timing logic 20 and will be discussed hereinafter.

The output of memory 22 is transferred on lines 29, 31 and 33 into 3×3 registers 24. On each such line, and again by way of example, three pixels are transferred for a masking operation to be performed by convolver 26. With reference to FIG. 2, the 3×3 registers 24 are coupled so that each line of video is effectively transferred through successive registers. The most recent line of pixels (actually only three (3) pixels thereof at a time) are in registers 40, 41 and 42. Eight (8) binary bits represents a pixel. Also, as stated earlier, there may be 512 pixels per line. Registers 58, 60 and 62 will contain three (3) pixels of the previous line, whereas, registers 64, 66 and 68 will contain three (3) pixels of the next most previously received line.

Thus, registers 24, at any given time, contain a nine by nine matrix of pixel information. This matrix changes each time a clock or toggle (T) pulse is received on line 35 from timing generator 36 of control and timing logic 20. From FIG. 2, it can be seen that line 19 received at the input of memory 22 is directly coupled to line 29 at one output of memory 22 and is shown in FIG. 2 as a combined line 19/29. It is also noted that each time a convert pulse is generated, then with appropriate phasing, a latch pulse on line 35 is generated, and the pixel information effectively shifts one (1) position, such that, for example, the pixel information that was in register 40 will be transferred to register 41, and such that the pixel information that was in register 41 will be transferred to register 42, etc.

As shown in FIG. 2, memory 22 may comprise two (2) random addressable memories (RAM) 44 and 46. Each such RAM may have 512 locations which correspond to the number of pixels per line. Each location includes eight (8) bits of information. During each pixel time (i.e., the rate of the convert pulse) the value from RAM is read and a new value of the next line is stored in place thereof.

Thus, digital video is received by memory 22 on line 19 and initially transferred to registers 24 on line 29 and through RAMs 44 and 46 on lines 31 and 33 respectively. As shown in FIG. 2, the inputs of RAMs 44 and 46 are actually received on lines 48 and 50 from the outputs of registers 40 and 58 respectively. The outputs of registers 40 and 58 are also coupled to the inputs of registers 41 and 60 respectively. Thus, the pixel information for the present line is received in registers 40, 41 and 42, and are eventually received in registers 58, 60 and 62 for the previous line, and in registers 64, 66 and 68 as the next most previous line through RAMs 44 and 46, which are addressed by 9-bit counter 54.

Counter 54 generates a 9-bit address based upon a clock input on line 47 from timing generator 56, which is received at the convert pulse rate with pulse phasing as required. The sync pulse is received at the master reset (MR) input of counter 54 and resets counter 54. A 9-bit counter is used to accommodate addressing for the 512 pixels per line. RAMs 44 and 46 also receive an output enable (OE) pulse at the same rate as the convert pulse, but phased as necessary. The output enables pulse is used to enable the reading of information from the RAMs. When writing information into the RAMs, the output enable pulse is disabled.

Figure 3:
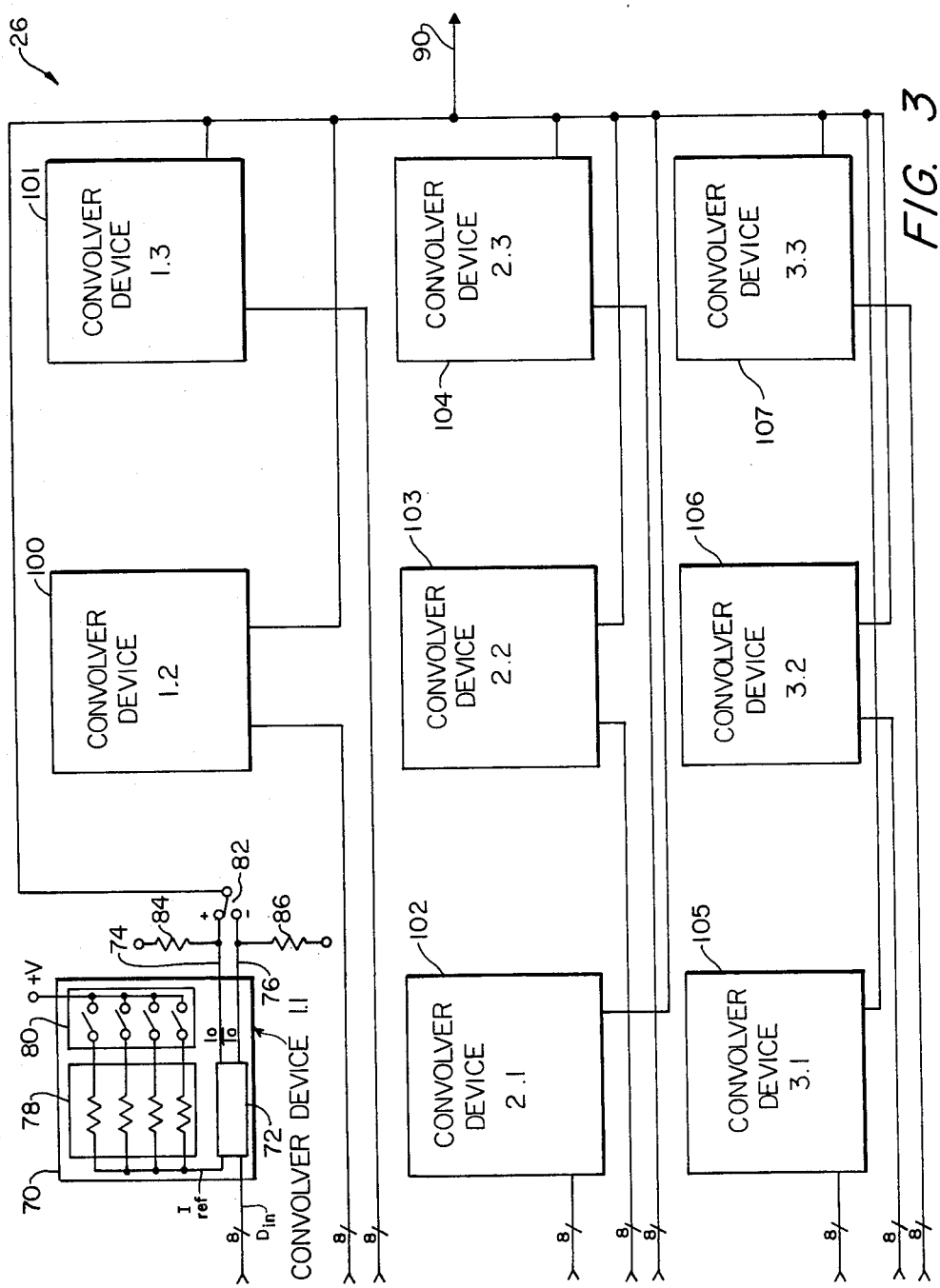
FIG. 3 illustrates details of the hardware convolver and mask matrix of the present invention.

Now referring to FIG. 3, a detailed block diagram of the convolver 26 with the mask matrix 28 is shown. One element of the convolver 26 is a multiplying digital to analog converter 72 which may be purchased as Model Number DAC-08 from various circuit manufacturers, such as National Semiconductor Inc. or Precise Monolithic Inc. Device 72 converts digital signals to an analog output with reference to and as masked by an analog reference input. Thus, it is multiplying a digital value times an analog value and generating an analog output.

The device 72 has a reference input which will be referred to as one input of the mask matrix 28. This mask is provided by element 78 which includes several resistors, each connected to respective switches in box 80. The other side of such switches is coupled to a voltage source (+V). The combination of devices 78 and 80 provide a current reference (IREF), which may be at different levels, dependent upon which one(s) of the switches in box 80 are closed. Also, by use of switch 82, a plus or minus analog output mask will be generated. Any combination of switches can be set giving up to, for example, sixteen (16) mask values. Resistors 84 and 86 provide a voltage level at the plus and minus terminals of switch 82 in response to the current output from device 72. The other ends of such resistors are connected to an appropriate bias voltage (not shown).

There are nine equivalent devices 70 each of which include the elements of device 70. These devices 100 through 107 are each coupled to a separate output from registers 24. The inputs are coupled as shown in FIGS. 2 and 3 by identifiers 1.1, etc., and the device number. Each of the nine outputs from the nine devices, as represented by device 70, are summed together on line 90. Line 90 is coupled to the output buffer 30 which includes amplifier gain, as well as a circuit to add the sync signal to the video output on line 32.

Having described the operation of the apparatus of the present invention with respect to the hardware components, it may be seen that such apparatus performs a function in accordance with the following equation:

$$V_o(i,j) = \sum_{k=0}^{n-1} \sum_{l=0}^{m-1} v(i+k, j+l) \cdot M(k,l)$$

In such equation, $V_o(i,j)$ represents the video output on line 32, where i is a pixel location within a line and j is the line number. Also in such equation, n equals the size of the convolver in lines (e.g., 3 lines), k equals the line (0(present), 1, or 2)), and 1 is the pixel (0, 1 or 2) within a line. In addition, m is the size of the convolver in pixels (e.g., 3), v is the video input on line 10, and M is the mask coefficient. The equation specifies a summation of the results of the multiplication of all three pixels of interest within a line times the corresponding mask signals, and then provides for the result of summing of such results for all three (3) lines.

Thus, there is a double summation on pixel and line of the input video, wherein there is a multiplication of the pixel times the mask value, followed by a multiplication of the mask value times the next pixel value which, by way of example, is performed three times per line. This is followed by a summing of the products for all three pixels and three lines, such that nine products are summed together to produce the video output.

Having described the invention, what is claimed as new and novel and for which it is desired to secure Letters Patent is:

1. A video enhancement system comprising:
    A. means for digitizing an analog video signal, said video signal comprising a plurality of lines of information sufficient to display information represented by said video signal, each of said lines of information comprising pixel information;
    B. storage means for storing a predetermined number of previously received lines of said digitized video signal, said predetermined number of previously received lines being less than said plurality of lines;
    C. a plurality of register means, coupld with said storage means, for storing a matrix array of signals representative of a predetermined number of said pixels of a presently received one of said lines and of said lines stored in said storage means;
    D. means for providing an enhancements signal; and
    E. means for multiplying said enhancement signal with said matrix array of signals in order to produce an enhancement video signal.

2. A system as in claim 1 wherein said enhancement signal includes an analog signal of selectable value.

3. A system as in claim 1 wherein said enhancement signal includes a plurality of analog signals, the number of said analog signals corresponding to said predetermined number of said pixels.

4. A system as in claim 3 wherein said means for multiplying comprises a plurality of devices corresponding in number to said predetermined number of said pixels, each of said devices coupled to multiply one of said analog signals with a corresponding one of said matrix array of said signals to produce an analog output.

5. A system as in claim 4 wherein said means for multiplying comprises means for summing each of said analog outputs to produce said enhancement video signal.

6. A system as in claim 1 wherein said storage means comprises a random addressable memory, said memory comprising a plurality of pixel storage locations equal in number to the number of said pixels per line times said predetermined number of said previously received lines of said digitized video signal.

7. A system as in claim 1 wherein said storage means comprises at least two random addressable memories, each of said memories comprising a plurality of pixel storage locations equal in number to the number of said pixels per line.

8. A system as in claim 7 further comprising means for receiving any pixel of information by each of said register means of said plurality of register means, and wherein said system further comprises addressing means for enabling the storage of each pixel of information into corresponding locations in said random addressable memories, wherein said addressing means also is coupled to enable the readout of said pixel information in each said location of said random addressable memories, and wherein said system further comprises means for transferring the pixel information read out of said random addressable memories into said plurality of register means.

9. A system as in claim 8 wherein said system further comprises means, coupled with said addressing means, for reading a said pixel of information from a said location in said random addressable memories and for storing a new value of said pixel information in the same said location.

10. A video enhancement system comprising:
    A. means for receiving an analog video signal, said signal represented by a plurality of pixel signals, a subplurality of which pixel signals represent a line of information;
    B. means for digitizing said pixel signals of said video signal, said video signal comprising a plurality of lines of information sufficient to display information represented by said video signal;
    C. means for temporarily storing a predetermined number of said digitized pixel signals from a predetermined number of previously received said lines of information, said predetermined number of said previously received said lines of information being less than said plurality of lines;
    D. means for generating a plurality of analog mask signals corresponding in number to the number of said pixel signals stored in said means for temporarily storing; and
    E. means for multiplying corresponding ones of said analog mask signals with corresponding ones of said digitized pixel signals in said means for temporarily storing in order to produce an enhanced analog video signal.

11. A system as in claim 10 wherein said means for multiplying includes means for summing the results of each multiplication of one of said mask signals times a one of said digitized pixel signals stored in said means for temporarily storing.

12. A system as claim 11 wherein said means for temporarily storing includes storage locations for at least two lines of information.

* * * * *